United States Patent [19]

Nishida

[11] Patent Number: 5,269,184
[45] Date of Patent: Dec. 14, 1993

[54] DEVICE FOR MEASURING AND CONTROLLING GROUND WATER LEVELS AND METHOD OF MANUFACTURING SUCH DEVICE

[76] Inventor: Tamotsu Nishida, 1128 McGill St., Covina, Calif. 91722

[21] Appl. No.: 974,699

[22] Filed: Nov. 12, 1992

[51] Int. Cl.⁵ .............................................. G01F 23/30
[52] U.S. Cl. .......................................... 73/322; 73/73; 73/319; 73/322.5; 116/228
[58] Field of Search ............... 116/110, 227, 228, 264; 73/73, 319, 322, 322.5, 864.63, 864.65, 864.66, 864.73, 864.74

[56] References Cited

U.S. PATENT DOCUMENTS

| | | | |
|---|---|---|---|
| 688,607 | 12/1901 | Dixon | 73/322 |
| 1,062,537 | 5/1913 | Culbertson | 73/322.5 |
| 3,169,322 | 2/1965 | Milo | 73/864.65 X |
| 3,390,463 | 7/1968 | Hirsch | 73/864.65 X |
| 3,613,310 | 10/1971 | Rynberk | 116/227 X |
| 3,941,078 | 3/1976 | McCloskey | 116/228 |
| 3,960,107 | 6/1976 | McCloskey | 116/228 |

Primary Examiner—William A. Cuchlinski, Jr.
Assistant Examiner—W. Morris Worth
Attorney, Agent, or Firm—Spensley Horn Jubas & Lubitz

[57] ABSTRACT

A device for measuring and/or controlling ground water levels and a method of manufacturing such device. An embodiment of the device comprises a first tubular member having a top and bottom end and a plurality of perforations for allowing liquid, such as water, to enter and exit the device. A float dimensioned to be slidably received within the first tubular member is provided. The float has a top and bottom opening, both being in flow communication with each other. The device also comprises a check valve located inside the first tubular member for selectively passing liquid through the bottom opening of the float. Further, the device includes a second tubular member located inside the first tubular member. The second tubular member is in flow communication with the top opening of the float and extends upwardly through and out of the top opening of the first tubular member.

24 Claims, 7 Drawing Sheets

DEVICE FOR MEASURING AND CONTROLLING GROUND WATER LEVELS AND METHOD OF MANUFACTURING SUCH DEVICE

FIELD OF THE INVENTION

The present invention relates generally to gardening and/or landscaping. More particularly embodiments of this invention relate to a device for measuring and/or controlling the level of ground water in a particular area, especially the area around the roots of a planted plant. Embodiments of this invention also relates to a method of manufacturing such device.

BACKGROUND

It is well known that all plants require water for growth and sustenance. It is also well known that excessive or inadequate water in and around the root area of a plant can be damaging and even deadly to a plant. For instance, many trees die because of root drowning—especially when the soil where the plants are planted is primarily clay type. In order to reduce and/or eliminate the risk of root drowning, drain holes are usually dug at the bottom of a planting pit to help drain and divert water away from the roots. Typically, these holes range from about 5 to 10 feet in depth. In cases where the soil contains a high concentration of clay, no matter how deep the drain holes are dug, once they are filled with water, without a place to be discharged, the water usually remains in the root area. As a result, the remaining water gradually rots the roots and eventually kills the plant.

Since the root system of plants is not visible, it is very difficult to determine the exact or desirable moisture conditions in the area of the roots. These conditions generally depend upon the nature and type of the soil, the natural water table, the amount of natural rainfall and the amount of additional water supplied. Because of these variable conditions, individuals, especially ones without a great deal of nursery or landscaping experience, oftentimes are unable to properly determine and maintain the optimum moisture conditions in the soil necessary to (1) prevent planted plants from either drowning or dehydrating and (2) promote the healthy growth of these plants. As a result, many valuable plants have been lost.

A variety of devices and/or systems have been created in order to help measure and/or control water levels in the ground, especially in areas where plants are being grown. For example, U.S. Pat. No. 3,613,360 to Rynberk discloses a water level indicating and control construction adapted to be forced into the ground for adding or removing water depending on the water level detected by the construction. Rynberk shows a construction comprising an outer tubular member having an open bottom end and additional openings formed at spaced intervals along the length thereof. An inner tubular member with a removable closure means located at its top end is slidably received within the outer tubular member. The inner tubular member serves as a dipstick to indicate the water level in the area surrounding the construction and as a suction device for removing water when the water level gets too high. One problem with the device of Rynberk is that by the time water has accumulated in the outer tubular member, the area surrounding the roots may already be saturated with enough water to drown the plant. Another problem is that installing the device of Rynberk may be difficult since the device must be forced into the ground a sufficient distance to cover an area having roots. During installation, the device may become damaged or parts may become clogged. Also during installation, roots may become damaged or severed by forcing the device of Rynberk into the ground.

There continues to be a need for a device which is able to effectively measure and control the level of water in and about the root area(s) of planted plants in order to help these plants grow healthy and prevent them from drowning and desiccating. There also is a need for a device which can be easily and inexpensively installed. In addition, it is desirable to provide a device which requires one to dig only a single drain hole having a depth of about two feet beyond planting pit.

SUMMARY OF THE DISCLOSURE

To overcome the aforementioned problems, embodiments of the present invention provide a device for measuring and/or controlling the level and amount of liquid, especially water, in an area of a root system of a planted plant(s) in order to help the plant(s) grow healthy and prevent the roots of the plant(s) from either drowning or drying up. An embodiment of the present invention also provides for a method of manufacturing such device.

In accordance with one embodiment of the present invention, the device comprises a first tubular member having a closed bottom end and a top end. The first tubular member also includes a plurality of perforations for permitting the entry and egress of liquid into and out of the first tubular member.

The device further comprises a float which is slidably received within the first tubular member and rides on the liquid which has entered the first tubular member. The float includes a top and bottom end, wherein each end has an opening. The openings of the float are in flow communication with each other.

The device also includes a second tubular member which is in flow communication with the top opening of the float and extends upwardly through and beyond the top opening of the first tubular member. The second tubular member moves along with the float and acts as a liquid level indicator. The second tubular member may also be used to help extract water from the device and help supply water back into the ground. Further, the device includes a check valve located inside the first tubular member and in flow communication with liquid inside the first tubular member and the bottom opening of the float.

In another embodiment of this invention, the float of the device is hollow and the check valve is located inside of and tightly secured to the bottom of the float such that the inlet port of the check valve is aligned with the opening at the bottom of the float. Also located in the float is a third tubular member defining a fluid channel connecting the outlet port of the check valve with the top opening of the float. The third tubular member has at least a perforation for allowing liquid passing through the check valve and flowing into the third tubular member to subsequently accumulate inside the float.

Another embodiment of the present invention comprises a method of manufacturing a device for measuring the level of liquid in an area of a root system of a planted plant. The method comprises forming a first tubular member having an open top end and a closed bottom end and a plurality of perforations for allowing liquid to enter and exit the first tubular member.

A float is formed having a top and bottom opening in flow communication with each other. The float is to be formed wherein it has an outer diameter less than the inner diameter of the first tubular member. A check valve is then secured to the bottom opening of the float for selectively passing liquid through the bottom opening of the float. A second tubular member is to be secured, in flow communication to the top opening of the float.

Next, the float along with the attached check valve and second tubular member is to be inserted into the first tubular member, valve end first and via the open top end of the first tubular member.

DETAILED DESCRIPTION OF THE PREFERRED EMBODIMENTS

Figure 1:
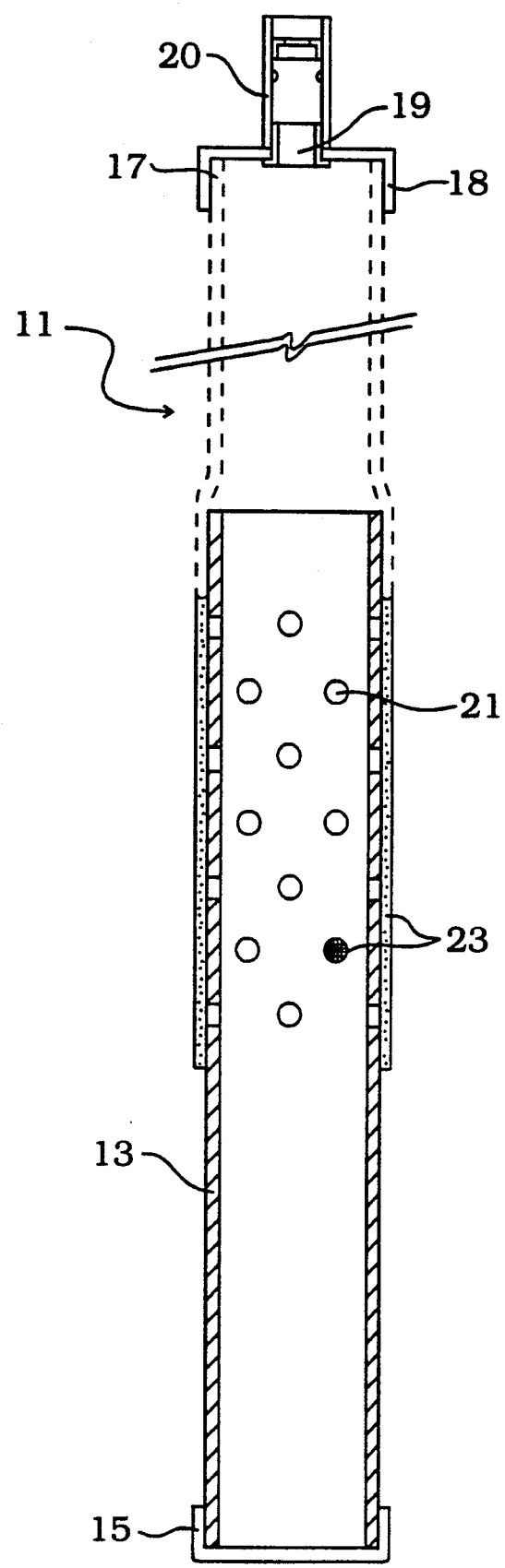
FIG. 1 is a side perspective view of the water measuring and controlling device according to an embodiment of the present invention.

Referring more particularly to the drawings, FIG. 1 shows a side perspective view of a water measuring and controlling device 11 according to an embodiment of the present invention.

The device 11 comprises a first tubular member 13 having a bottom end or base portion 15 which is closed and a top end 17 which has an opening 19. Preferably, the opening 19 is of a reduced diameter, i.e., the diameter of opening 19 is less than the diameter of the first tubular member 13. The dimensions of the first tubular member 13 may vary or be adjusted depending on, for example, the depth of the planting pit 70 (see FIG. 6), the size of the area sought to be drained and/or the type of soil in which the plant is or will be planted. For example, an extension piece of tubing may be added to the first tubular member 13 in order to increase the length of the device 11.

In the illustrative examples shown in FIGS. 1-6, the first tubular member 13, preferably, has a width of approximately 4" and a length ranging from about 36" to about 52", and more preferably from about 40" to about 48". The first tubular member 13 is preferably constructed of a solid, relatively thin, corrosion-resistant, lightweight and water-impervious rigid material. More preferably, the first tubular member is made of polyvinyl chloride ("PVC") plastic pipe.

The first tubular member 13 also includes a plurality of perforations 21. Preferably, the perforations 21 are formed substantially along the length and around the circumference of the first tubular member 13 at spaced intervals. These perforations 21 are provided to permit the entry and egress of liquid, into and out from the first tubular member 13, respectively.

If one were to divide the first tubular member 13 into three equal parts along the length thereof; bottom, middle and top, it would be noticed that approximately the bottom and top one-third portions of the first tubular member 13 do not include any perforations 21 and that only about the middle one-third portion of the first tubular member 13 has the perforations 21. For example, with respect to the device 11 as shown in FIGS. 1-6, the perforations 21 are located about 12" up from the bottom 15 of the first tubular member 13 and extend upwardly, therefrom, a distance of about 12" to about 18". Further, the bottom one-third portion actually is a reservoir for liquid flowing into the first tubular member 13.

The perforations 21 preferably have a diameter ranging from about ¼" to about 1" in diameter, and more preferably from about ½" to about ¾". It is also preferable that each perforation 21 is covered with a screen material 23 having a mesh size selected to permit liquid to enter or exit the first tubular member 13 while preventing gravel, silt, soil, dirt and other particulate matter from entering the first tubular member 13 via the perforations 21.

With respect to the top end 17 of the first tubular member 13, it is tightly covered with an easily removable closure such as a cap, cover, lid or the like 18 having an opening 19 in the center thereof. In accordance with the illustrative examples set forth in FIGS. 1-7, the top end 17, preferably, is tightly covered with a drain pipe cap 18 which may, for example, be tightly screwed or press-fit onto the first tubular member 13. The drain pipe cap 18 is approximately 4" in diameter and has an opening 19 in the center thereof with a diameter ranging from about ¾" to 2". More preferably, the opening 19 of the cap 18 is about 1⅞" in diameter.

Additionally, the opening 19 of the cap or closure 18 may further include an extension piece 20 having a diameter substantially equal to the diameter of the opening 19 and a length ranging from about 1" to about 6". More preferably the extension piece 20 is about 2½" in length.

As shown in FIGS. 2-5, the device 11 of this invention further comprises a float 25 which is positioned and dimensioned inside the first tubular member 13 to ride on the surface of liquid, i.e., water, which may enter the first tubular member 13. Therefore, the diameter of the outer surface of the float 25 should be less than the diameter of the inner surface of the first tubular member 13. The float 25 includes a top opening and a bottom opening 27 and 29, respectively, which are preferably of reduced diameter, i.e., the diameter of the top 27 and bottom 29 openings is less than the diameter of the float 25. The openings 27 and 29 are in flow communication with one another so that liquid may pass through the float 25, from the bottom to the top and vice versa.

Depending on the particular embodiment of the present invention, the float 25 may be hollow or substantially solid throughout. Preferably, the inside of the float 25 is hollow in order for it to store liquid, especially ground water, lessen the overall weight of the device 11 and/or house other elements discussed below, such as a check valve 40 and a fluid channel 47. (See FIGS. 2-4.)

In view of the illustrative examples shown in FIGS. 2-5, the float 25 is approximately 3" in diameter and has a length ranging from about 10" to about 24". Further the size of the openings 27 and 29 is about ½" to about ¾" in diameter.

Even though the float 25 can be made of any buoyant material such as plastic (e.g., expanded rigid polystyrene plastic (Styrofoam TM), polyethylene or polypropylene plastic) or even a metal material, it is preferred that the float be made of the same or similar material as that of the first tubular member, i.e., PVC plastic.

Coupled to and in flow communication with opening 27 at the top of the float 25 is a second tubular member 34, as shown in FIGS. 2-5. An essentially leak-free connection is formed between the bottom end 35 of the second tubular member 34 and the top opening 27 of the float 25. The remainder of the second tubular member 34 extends upwardly and vertically through the first tubular member 13 wherein the top 36 of the second tubular member 34 exits through the top opening 19 thereof. When the float 25 is resting at the bottom of the first tubular member 13, the top end 36 of the second tubular member 34 projects through and beyond the opening 19 at the top of the first tubular member 13, preferably, a distance ranging from about ½" to about 2" and more preferably about 1".

The second tubular member 34, as well as the float 25, is designed to move vertically in response to the changes in the level of liquid in the first tubular member 13. Therefore, it is necessary that the outer diameter of the second tubular member 34 is less than the size of the diameter of the top opening 19 of the first tubular member 13.

The second tubular member 34, preferably, is made of the same material as that of the first tubular member 13, e.g., PVC plastic. Even though the dimensions of the second tubular member 34 may vary depending on the dimensions of the first tubular member 13 and/or the float 25, according to the illustrative example of FIGS. 2 and 4-5, the diameter of the second tubular member, preferably, is about ½" and its length preferably ranges from about 28" to about 36".

The top end 36 of the second tubular member 34 which passes through the top opening 19 of the first tubular member 13 includes a removable, but airtight closure or cap 37. As shown in FIGS. 2, 4, 5 and 7, the second tubular member 34 also may include a stopper 39, located along the length thereof, for regulating the height in which the float 25 may rise. Preferably, the stopper 39 may adjusted accordingly along the length of the second tubular member 34.

Further, the second tubular member 34 may include calibrated markings thereon so that the level or amount of liquid (e.g., water) present in the ground, in and around the area where the device 11 is embedded, or in the first tubular member 13, can be determined. The second tubular member 34 may also be calibrated, accordingly, to help indicate whether the soil is dangerously saturated with liquid or whether the soil is too dry.

Figure 2:
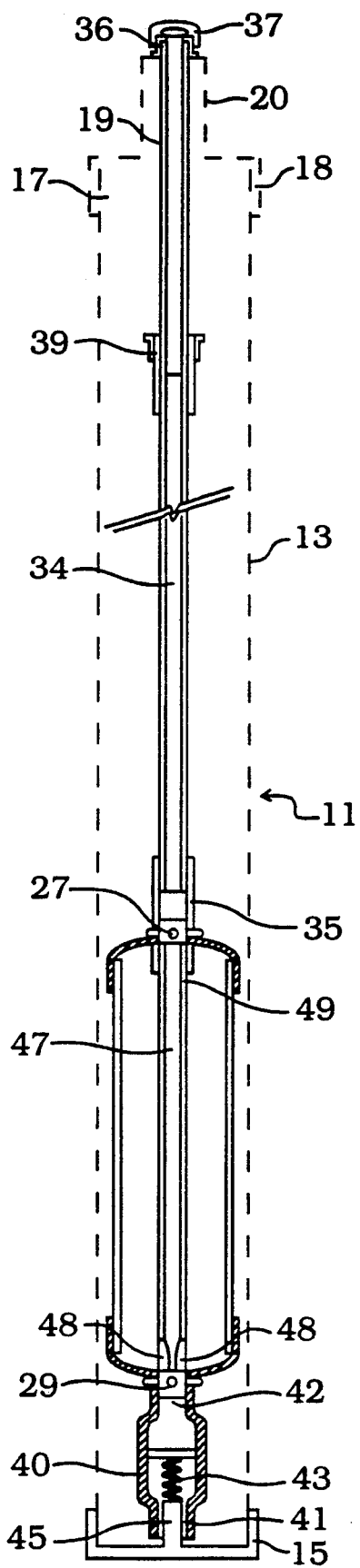
FIG. 2 is a sectional view of a device according to an embodiment of the present invention, wherein the float is used to remove water.
Figure 3:
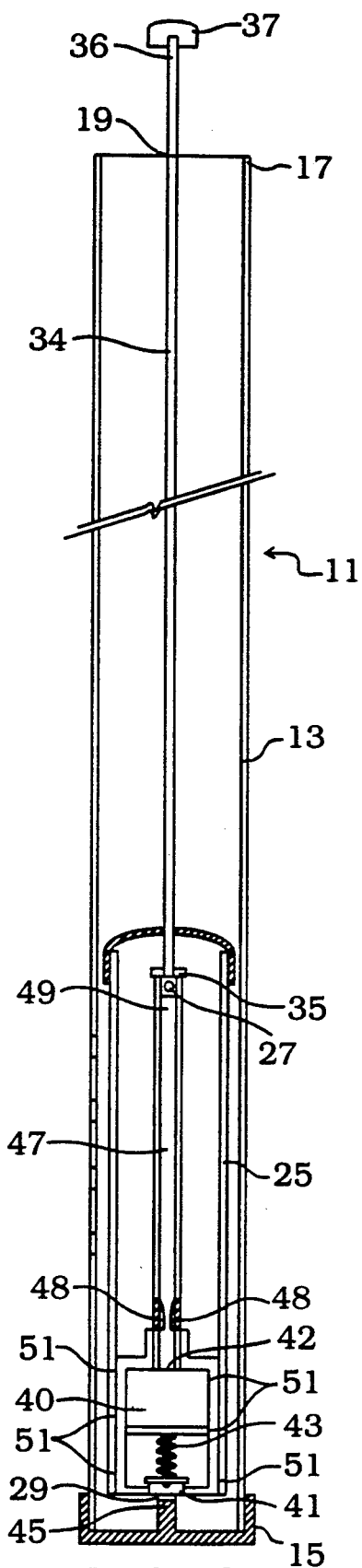
FIG. 3 is a sectional view of a device according to another embodiment of the present invention, wherein the float is used to remove water.
Figure 4:
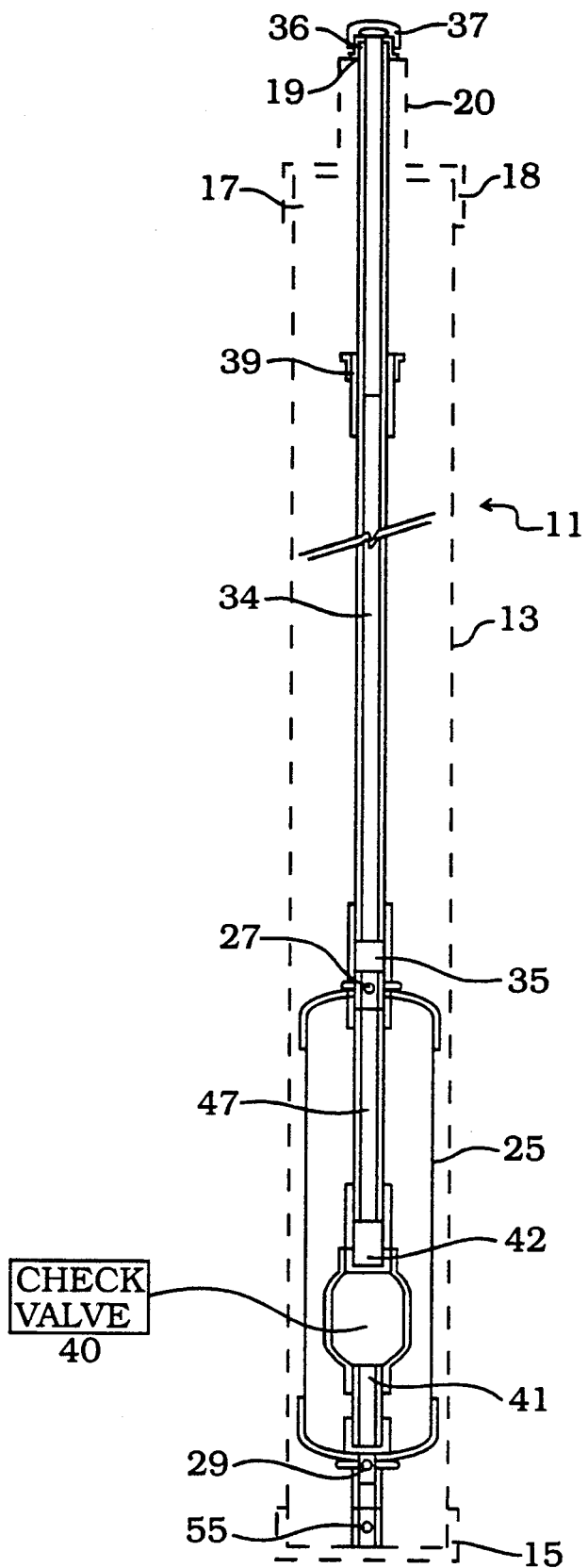
FIG. 4 is a sectional view of a device according to another embodiment of this invention, wherein a pump is used to remove water.

Also shown in FIGS. 3 and 4, the device 11 further comprises a check valve 40 which is located inside the first tubular member 13 and is in flow communication with the bottom opening 29 of the float 25. The check valve 40 includes both an inlet and an outlet port 41 and 42, respectively, allowing for liquid to flow from the first tubular member 13 into and/or through the float 25 and vice versa. The check valve 40 according to an embodiment of the present invention preferably has a body length ranging from about 4⅛" to about 6 3/16" and an IPS (International Pipe Standard) size ranging from about ¾" to about 1½". It is also preferable that the check valve 40 be made of PVC plastic. Preferably, the check valve 40 also includes a spring load 43 (see FIGS. 2 and 3) having a spring tension strong enough to support the weight of the float 25. In the illustrative embodiments of the device 11 shown in FIGS. 1-6, the spring load 43 preferably has a spring tension ranging from about ¼ to about 5 pounds, and more preferably from about 3 to 5 pounds.

It is preferable that the device 11 includes a check valve opener 45 which is located inside the first tubular member 13. (See FIGS. 2 and 3.) Preferably, the check valve opener 45 comprises a nose which protrudes upwardly and vertically from the bottom end or base portion 15 of the first tubular member 13. The check valve opener 45 is aligned with the inlet port 41 and protrudes a distance sufficient such that when pressed, manually or mechanically, against the check valve opener 45 with sufficient force, the spring load 43 is released allowing for the flow of liquid through the check valve 40. Alternatively, the check valve opener 45 may be coupled to a portion of the check valve 40 such that when pressed against the bottom 15 of the first tubular member 13 with sufficient force, the opener 45 causes the spring load 43 to be released. Preferably, the check valve opener 45 is approximately at least 1⅛" in length and possesses a width equal to approximately one-half the size of the diameter of the inlet port 41. In the illustrative embodiments set forth in FIGS. 1-3, the width of the check valve opener 45 is about ⅜".

The check valve 40 may be located either within or outside of the float 25 as long as the valve 40 allows liquid to generally flow in a direction from the bottom 15 of the device 11 upwardly to the top 17, as it accumulates inside the device 11.

In one embodiment of the present invention wherein the float 25 is used to remove water from the device 11, the check valve 40, which preferably includes a spring load 43, is located outside of the float 25. (See FIG. 2.) In this embodiment, the outlet port 42 of the valve 40 is coupled to and is in flow communication with the bottom open end 29 of the float 25. The inlet port 41 is aligned with the check valve opener 45 such that the opener 45 extends into the inlet port 41, thereby allowing the spring load 43 portion of the valve 40 to rest on the opener 45.

FIG. 3 illustrates another embodiment of the present invention wherein the float is used to remove water from the device 11. In this embodiment, instead of the check valve 40 being located outside of the float 25, the check valve 40 is located and secured inside the float 25. It is preferred that the check valve 40 of this embodiment includes a spring load 43.

The check valve 40, as shown in FIG. 3, is located inside the bottom of the float 25 and tightly secured therein such that the inlet port 41 is aligned with the bottom opening 29 of the float 25. It is preferred that the body of the check valve 40 has an outer diameter substantially equal to the diameter of the inner wall of the float 25. Also, in order to ensure that liquid flowing through the bottom opening 29 of the float 25 passes immediately through the inlet port 41 of the check vavle 40 only, it is preferred that the check valve 40 is secured and sealed within the float 25 using O-ring-type gaskets 51, for example. Alternatively, check valve 40 may be slidable within the float 25 in order to help facilitate the discharge of water which has accumulated inside the float 25. Further, in this embodiment the inlet port 41 is aligned with the check valve opener 45 such that the opener 45 extends into the inlet port 41, thereby allowing the spring load 43 to rest on the opener 45.

Further, the float of the embodiments shown in FIGS. 2 and 3, preferably is hollow inside, except for the presence of the check valve 40 and a third tubular member 47 which defines a fluid channel therein. Preferably, the third tubular member 47 is coupled at one end to the outlet port 42 of the valve 40 and at the other end to the top opening 27 of the float 25. The third tubular member 47, preferably includes at least an opening 48 along the length thereof in order for liquid passing through the check valve 40 to flow into the fluid channel 47 and subsequently accumulate and collect inside the float 25. Preferably, the opening 48 is located towards the bottom of the float 25. In addition, the third tubular member 47 preferably includes an air hole 49 located along the length thereof, preferably towards the top of the float 25. Again, the size of the air hole 49 should be sufficient to permit liquid to pass through opening 48 and accumulate inside the float 25 (see FIGS. 2 and 3).

Figure 5:
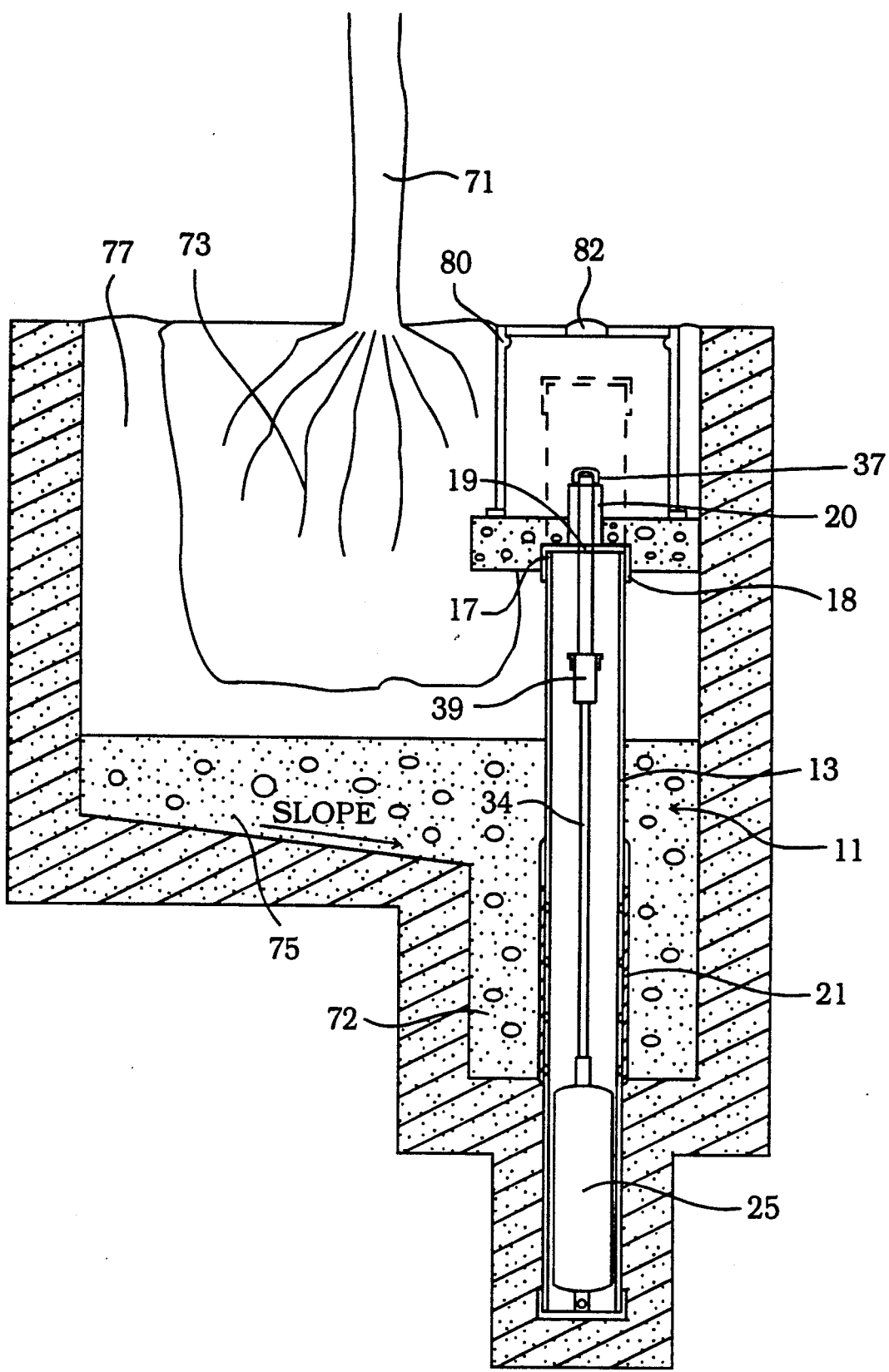
FIG. 5 is a sectional view of a device according to an embodiment of the invention as it is installed and embedded in the ground, the ground being shown in section.
Figure 6:
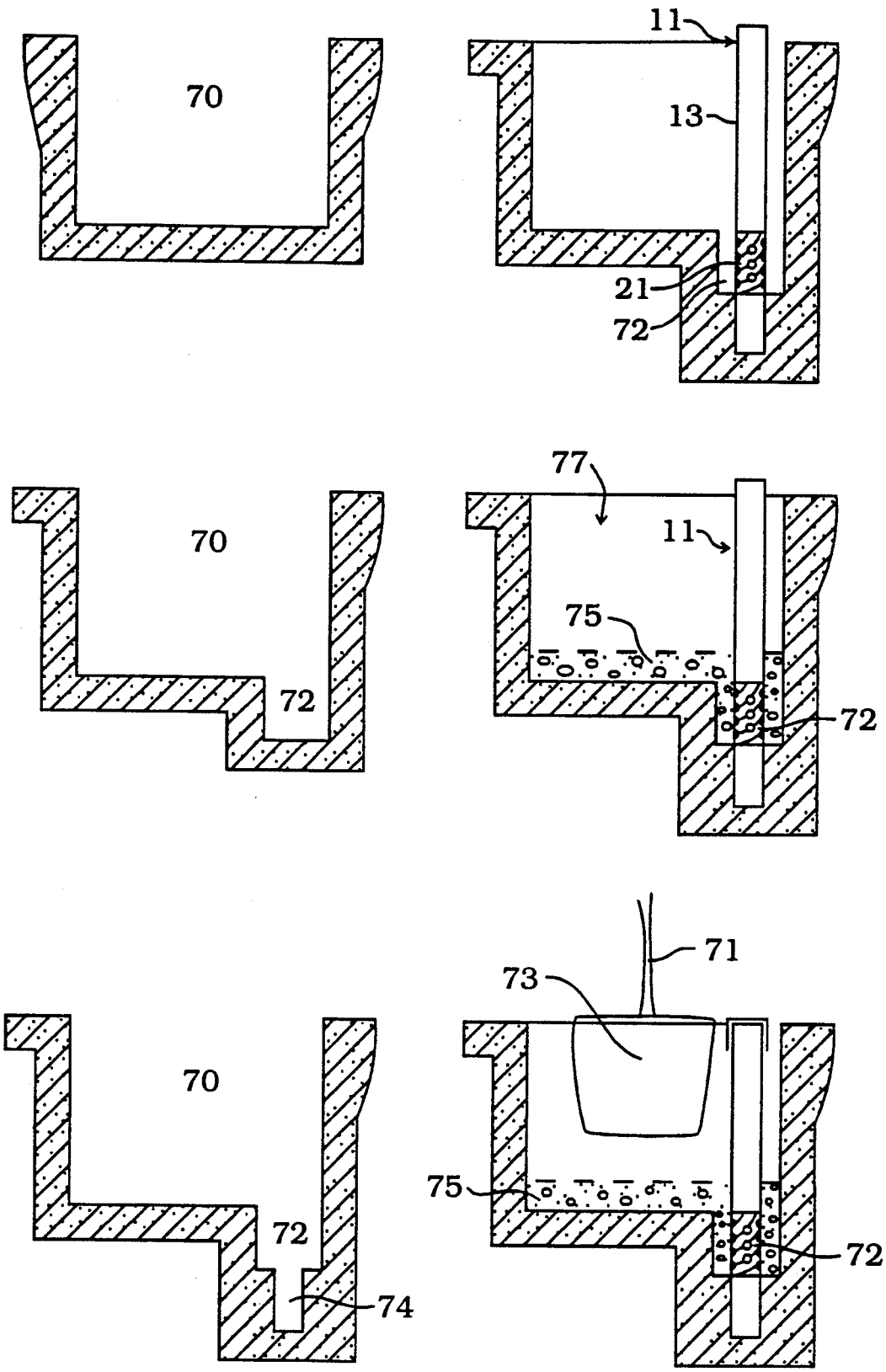
FIG. 6 is a sectional schematic view illustrating steps by which a device according to an embodiment of the present invention is installed and a plant may be planted.
Figure 7:
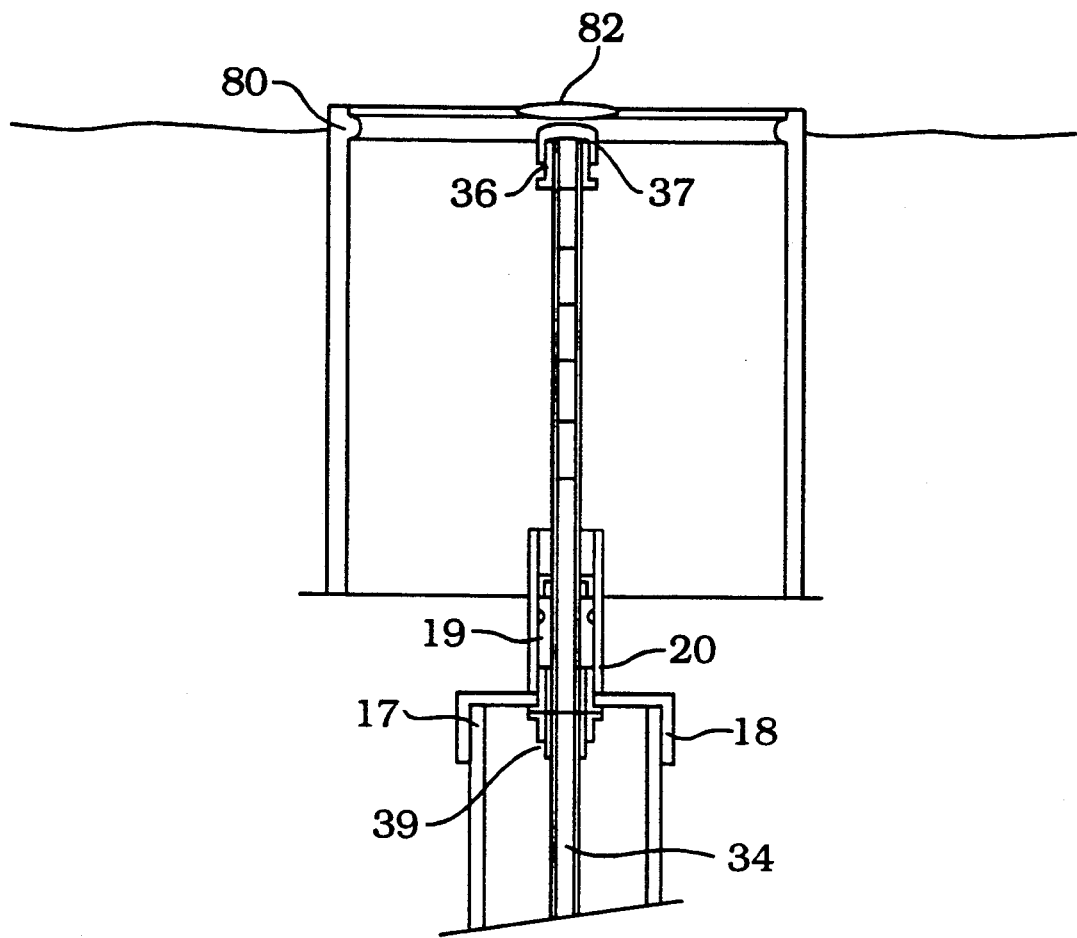
FIG. 7 is a partial sectional view of a device according to an embodiment of the invention, illustrating the top of the device being covered by a valve box and the second tubular member having risen to the top of the valve box.

In the use of the device 11 shown in FIGS. 2 and 3, it is first placed in the area of a root system 73 (see FIGS. 5 and 6). As liquid in the ground passes through the perforations 21 it is collected and accumulated at the bottom 15, inside the first tubular member 13. The float 25 along with the second tubular member 34 responds to the changes in the level of liquid inside the first tubular member 13. For example, as the level of liquid inside the first tubular member 13 rises, the float 25 and the second tubular member 34 also rise. The second tubular member 34 acts as an indicating rod which may be calibrated to determine the amount of liquid present in the ground, adjacent to the device 11. When it has been determined that the level of liquid in the ground is excessive, then the float provides a means for manually removing liquid from the device 11. To remove the liquid, the cap 37 at the top end 36 of the second tubular member 34 is removed to eliminate back pressure. Once the back pressure has been eliminated, the second tubular member 34 is pushed down a distance sufficient to cause the check valve opener 45 to activate and open the spring load 43 portion of the check valve 40. Pushing open the spring load 43 opens the valve 40 and allows the liquid to enter the float until the level of liquid in the float 25 is the same as the level of water accumulated in the first tubular member 13.

The closure 18 at the top end 17 of the first tubular member 13 is then removed so that the float 25 containing the liquid may be taken out of the device 11. Once removed from the first tubular member 13, the spring load 43 is pushed open manually, thereby reopening the valve 40 and causing the liquid to drain out of the float 25. Preferably, a cap or dish having a check valve opener in the center thereof, similar to the check valve opener 45 described above, may be used as a drain saucer.

Alternatively, if the inside of the float 25 does not include a fluid channel 47, then liquid contained inside the float may be removed simply by the turning the float 25 and second tubular member 34 upside down so that the liquid may easily spill out. It is also preferred that the liquid which is to be drained or removed from the float 25 not be reabsorbed into the ground and, instead, be captured in a pan or bucket.

In addition, the device as shown in FIGS. 2 and 3, may also be used to help introduce and feel liquid into the ground in cases where the moisture level is too low. In order to introduce liquid back into the ground via the device 11 of this invention, the device 11 must be embedded in the ground and the closure or cap 37 must be removed from the second tubular member 34. Liquid is then passed through the opening at the top end 36 of the second tubular member 34 while the spring load 43 portion of the check valve 40 remains open. When the level of liquid inside the device rises to at least the level where the perforations 21 are located, then the liquid can exit the device 11 and flow into the ground.

In yet another embodiment of the present invention, instead of using the float 25 to remove liquid from the device 11, a pump is used. (See FIG. 4.) In this embodiment, the float includes a fluid channel 47 located therein which connects the bottom opening 29 of the float 25 to the top opening 27 of the float 25. In addition, a check valve 40, preferably having a spring load, is located along the length of the third tubular member 47 and, moreover, is in flow communication with the third tubular member 47. The check valve 40 is positioned inside the float 25 allowing liquid to flow generally from the bottom of the device 11 upwards towards the top of the device 11. It is preferred that the tension of the spring load 43 of the check valve 40 of this embodiment ranges from about 3 to about 5 pounds.

In this embodiment, a coupling attachment 55 with holes is joined to the outside of the bottom of the float 25, in flow communication with the bottom opening 29. Preferably, an essentially leak-free connection is formed between the coupling attachment 55 and the bottom opening 29 of the float 25. Preferably, an O-ring is used to help seal the connection. The coupling attachment 55 helps lift the bottom open end 29 of the float 25 off of the bottom 15 of the first tubular member 13 and allows for liquid accumulated inside the device 11 to pass more easily through the bottom opening 29 of the float 25.

In the use of the device shown in FIG. 4, for purposes of measuring the level of liquid in the ground, it operates in substantially the same way as the device shown in FIGS. 2 and 3.

For purposes of removing excess liquid from the ground, generally, the cap 37 is removed from the second tubular member 34 and a suction pump with a hose attachment (not shown) is coupled to the open top end 36 of the second tubular member 34. When activated, the pump sucks the water accumulated at the bottom of the device 11 out of the device 11.

Also disclosed herein is a method of manufacturing a device 11 according to an embodiment of the present invention for measuring and/or controlling the level of liquid in an area of a root system of a planted plant. The method comprises the steps of forming a first tubular member 13 which has an open top end 17 and a closed bottom end 15. The first tubular member also includes a plurality of perforations 21 for allowing liquid to pass into and out of the first tubular member 13. If one were to divide the first tubular member 13 into three equal parts along the length thereof; bottom, middle and top, only about the middle third portion would include the perforations 21. Further, the bottom one-third portion would act as a reservoir.

The method also includes forming a float 25 having a top 27 and bottom 29 opening which are in flow communication with each other. The float 25 should have an outer diameter less than the inner diameter of the first tubular member 13. It is preferable that the top 27 and bottom 29 openings have a reduced diameter, i.e., a diameter less than the diameter of the float 25.

A check valve 40 is then secured to the bottom opening 29 of the float 25 for selectively passing liquid through the bottom opening of the float 25. Alternatively, the check valve 40 may be placed and secured inside the bottom of the float 25, as shown in FIGS. 2 and 3. It is preferable that the check valve 40 includes a spring load 43 and a means 45 for activating the spring load 43. The means 45 may comprise a check valve opener nose which is either integral with the inlet port 41 of the valve 40 which protrudes upwardly and vertically from the bottom closed end 15 of the first tubular member 13, as shown in FIGS. 2 and 3.

A second tubular member 34 is secured at one end 35 to the top opening 27 of the float 25 such that it is in flow communication with the top opening 27. Preferably, the second tubular member 34 includes a stopper 39 and calibration markings for helping one read and measure the level of liquid in the ground.

The float 25, along with the attached check valve 40 and the second tubular member 25, is inserted into the first tubular member 13, valve end first, via open top end 17 such that the second tubular member 34 protrudes from open top end 17. More preferably, an easily removable closure, such as a cap, cover, lid or the like 18 having an opening 19 in the center thereof may be used to tightly cover open top end 17, as shown in FIGS. 2, 4, 5 and 7. The size of the opening 19 must be sufficient to allow the second tubular member 34 to slidably pass through it. The end 36 of the second tubular member 25 which protrudes from open top end 17 is open itself and is preferably defined by a removable airtight closure 37.

The method of this embodiment also may comprise covering the perforations with a screen material 23 having a mesh size selected to permit liquid to enter the first tubular member and prevent gravel, soil, silt, dirt and other particulate matter from entering the first tubular member 13.

Further, the float 25 of this embodiment may include a hollow portion formed therein. Within this hollow portion, a third tubular member 47 defining a fluid channel may be disposed wherein the third tubular member 47 is in flow communication with the top 27 and bottom 29 openings of the float 25. It preferable that the third tubular member 47 includes at least an opening 48 for allowing liquid to enter the float 25. Also, it is preferable that the third tubular member includes an air hole 49 located, preferably, close to the top opening 27 of the float to help facilitate the flow of liquid through the opening(s) 48 of the third tubular member 47 and into the hollow portion of the float 25.

With respect to achieving the optimal results of the device 11 of the present invention, it is important to know how to best install the device 11. One embodiment illustrating how to install the device 11 comprises the following steps.

First a planting pit 70 is to be prepared. The overall length, width and depth of the pit 70 depends on the size of the plant 71 to be planted and/or the size of the root ball or system 73 of the plant 71. The planting pit 70 must be sufficient in size to accommodate a planted plant 71 and the device 11. In the illustrative embodiment shown in FIGS. 5 and 6, the size of the pit 70 is approximately 36" long, 36" wide and 28" deep.

Next, a second pit 72 is prepared within the planting pit 70, in a location where the device 11 is to be placed. Even though the size of the second pit 72 may vary depending, for example, on the size of the device 11 being used, the second pit 72 nevertheless, is smaller than the planting pit 70. In accordance with the preferred embodiments of the device 11 shown in FIGS. 1-6, it is preferred that the second pit 72 be approximately $12'' \times 12'' \times 12''$ in size.

Also, with respect to the planting pit 70, it is preferred that its bottom surface slopes downwards into the second pit 72 at an angle sufficient to cause the ground water and/or other ground liquids to flow into the second pit 72 more easily.

Subsequently, a third pit 74 is prepared in the second pit 72. The size of this pit 74 preferably is smaller in size than the second pit 72. The shape and size of this pit 74, preferably, is substantially similar to the shape and size of the bottom third lower portion of the first tubular member 13, not possessing the perforations 21. Preferably, according to the illustrative examples set forth in FIGS. 1-6, the third pit 74 is approximately 12" deep and about 4" in diameter. Again, depending on the dimensions of the device 11 of this invention the size of the third pit 74 may vary.

After having prepared pits 70, 72 and 74, the device 11 is then placed vertically into the third pit 74, bottom end 15 first. Soil is then compacted around the portion of the device 11 inside the third pit 74. Preferably, the soil is compacted around the device 11 up to about the bottom surface of the second pit 72. It is preferable that site soil be used and compacted since site soil helps support the device 11, and more significantly site soil also helps prevent the ground water and other liquids in the ground from easily seeping into the ground.

The next step of the method of this invention is filling the entire second pit 72 and a portion of the bottom of planting pit 70 with gravel 75. It is preferable that the gravel 75 fully surrounds approximately the portion of the device 11 having the perforations 21. Generally, approximately the bottom 1/6 to about the bottom ½, and preferably the bottom 1/6 to about the bottom 1/5, of the planting pit 70 is covered with gravel 75. More preferably, according to the illustrative embodiments shown in FIGS. 5 and 6, about 6" to about 12" of the bottom of the planting pit 70 is covered with gravel.

It is preferred that crushed gravel, and more preferably ¾" crushed gravel, be used so that the ground water may pass more easily into the device 11 via the perforations 21.

Afterwards, substantially the remainder of the planting pit 70 is filled with soil, sand or any other medium in which a plant takes hold and develops 77 up to approximately ground level. Preferably at the same time, a plant 71 is planted in the pit 70 wherein its roots 73 are adequately covered by the soil or sand 77, for example.

In addition, a valve box 80 may be used to cover and protect substantially the top of the device 11, as shown in FIGS. 5 and 6. With respect to the illustrative examples of the device 11 shown in FIGS. 5 and 6, the valve box 80, preferably is about 10" high and 10" wide. Further, the valve box 80 may include a see-through window 82 on its upper surface. The window 82 has a diameter ranging from about 1" to about 10", and more preferably from about 1½" to about 3". The valve box 80 may be made of the same material used to make the first tubular member 13. Preferably, the valve box 80 is made of PVC plastic.

Having thus described exemplary embodiments of the present invention, it should be noted by those skilled in the art that the within disclosures are exemplary only and that various other alternatives, adaptations and modifications may be made without departing from the spirit and scope of this invention. Accordingly, the present invention is not limited to that precisely shown and described herein, but is only limited by the following claims.

What is claimed is:

1. A device for measuring and controlling the level of ground water in an area of a root system of a plant comprising:
    a first tubular member having a top and bottom end;
    the first tubular member having a plurality of perforations for permitting the entry and egress of liquid into and out of the first tubular member;
    a float dimensioned to be slidably received within the first tubular member;
    the float having a top opening and bottom opening and wherein the top opening is in flow communication with the bottom opening;
    a check valve located within the first tubular member, the valve including an inlet port and an outlet port in flow communicating with the float bottom opening wherein the check valve permits liquid to selectively flow through the bottom opening of the float; and
    a second tubular member located within the first tubular member wherein the second tubular member is in flow communication with the top opening of the float, and wherein the second tubular member extends upwardly through and beyond the top end opening of the first tubular member.

2. The device according to claim 1 wherein the first tubular member includes a bottom, middle and top one-third portion located along the length thereof, and wherein the perforations are located along substantially the middle one-third portion.

3. The device according to claim 2 wherein the bottom one-third portion is a reservoir.

4. The device according to claim 3 wherein the top end of the first tubular member has an opening of reduced diameter.

5. The device according to claim 1 wherein the perforations are covered with a screen material having a mesh size selected to permit liquid to enter the first tubular member and prevent gravel, soil, silt, dirt and other particulate matter from entering the first tubular member.

6. The device according to claim 1 wherein the open top end of the second tubular member is defined by a removable airtight closure.

7. The device according to claim 1 wherein the second tubular member includes a stopper.

8. The device according to claim 1 wherein the check valve includes a spring load.

9. The device according to claim 8 further comprising a check valve opener protruding upwardly and vertically from the bottom end of the first tubular member, the opener being aligned with the inlet port of the check valve and protruding a distance sufficient to cause the check valve to open up and allow the passage of liquid through the check valve when the spring load is manually pressed against the opener with a sufficient amount of force.

10. The device according to claim 1 wherein the float includes a hollow formed therein.

11. The device according to claim 10 wherein the float includes a third tubular member defining a fluid channel located therein connecting the bottom opening of the float to the top opening of the float, and wherein the third tubular member includes an opening for allowing fluid to enter the float.

12. The device according to claim 11 wherein the first, second and third tubular members, float and check valve are made of polyvinyl chloride plastic.

13. A device for measuring and controlling ground water comprising:
    a first tubular member having a top and bottom end wherein the bottom end is closed and the top end has an opening of reduced diameter, and wherein the bottom end includes a check valve opener which protrudes vertically within the first tubular member;
    the first tubular member having a plurality of perforations located substantially along the length thereof for permitting the entry and egress of water into and out of the first tubular member;
    the perforations being covered with a screen material having a mesh size selected to permit liquid to enter the first tubular member and prevent gravel, soil, silt, dirt and other particulate matter from entering the first tubular member.
    a hollow float dimensioned to be slidably received within the first tubular member wherein the float has a top opening and bottom opening of reduced diameter;
    a spring load check valve located and tightly secured inside the bottom of float, the check valve including an inlet port and an outlet port;
    the inlet port of the check valve being aligned with the bottom opening of the float and the check valve opener to allow liquid to pass from the first tubular member through the bottom opening of the float up through the check valve;
    a second tubular member located within the first tubular member wherein the second tubular member is in flow communication with the top opening of the float and extends upwardly and vertically through and outside the opening at the top end of the first tubular member;
    the second tubular member having a removable airtight closure located at an end outside the first tubular member; and
    a third tubular member defining a fluid channel located inside the float wherein the third tubular member connects the outlet port of the check valve with the top opening of the float, and wherein the third tubular member includes an opening for allowing liquid passing therethrough to enter the float and an air hole for helping the liquid flow from the opening into the float.

14. The device according to claim 13 wherein the spring load has a tension ranging from ¼ to 5 pounds.

15. The device according to claim 13 wherein the second tubular member includes calibrated markings to help measure the amount of liquid in the ground.

16. The device according to claim 13 wherein O-ring-type gaskets are used to tightly secure the check valve within the float.

17. The device according to claim 13 wherein the first and second tubular members, float, fluid channel and check valve are made of polyvinyl chloride plastic.

18. A method of manufacturing a device for measuring the level of liquid in an area of a root system of a planted plant, the method comprising the steps of:
forming a first tubular member having an open top end and a closed bottom end and a plurality of perforations for allowing liquid to enter and exit the first tubular member;
forming a float having a top opening and a bottom opening being in flow communication with each other, and wherein the float has an outer diameter less than the inner diameter of the first tubular member;
securing a check valve to the bottom opening of the float for selectively passing liquid through the bottom opening of the float;
securing a second tubular member to the top opening of the float wherein the second tubular member is in flow communication with the top opening of the float; and
inserting the float having the check valve and the second tubular member secured thereto into the first tubular member, valve end first, via the open top end of the first tubular member such that the second tubular member protrudes from the open top end of the first tubular member.

19. The method according to claim 18 wherein the first tubular member includes a bottom, middle and top one-third portion located along the length thereof, and wherein the perforations are located along substantially the middle one-third portion.

20. The method according to claim 19 wherein the bottom one-third portion is a reservoir.

21. The method according to claim 18 further comprising covering the perforations with a screen material having a mesh size selected to permit liquid to enter the first tubular member and prevent gravel, soil, silt, dirt and other particulate matter from entering the first tubular member.

22. The method according to claim 18 wherein the open top end of the second tubular member is defined by a removable airtight closure.

23. The method according to claim 18 wherein the check valve includes a spring load and a means for activating such spring load.

24. The method according to claim 18 wherein the float includes a hollow portion formed therein and a third tubular member defining a fluid channel disposed therein wherein the third tubular member is in flow communication with the top and bottom openings of the float, and wherein the third tubular member includes an opening for allowing fluid to enter the hollow portion of the float.

* * * * *